United States Patent
Henrickson

[11] 3,742,389
[45] June 26, 1973

[54] VOLTAGE TO FREQUENCY CONVERTER HAVING DUAL STANDARD CHARGE DISPENSERS

[75] Inventor: Gary C. Henrickson, Palo Alto, Calif.

[73] Assignee: Vidar Corporation, Mountain View, Calif.

[22] Filed: June 23, 1971

[21] Appl. No.: 155,848

[52] U.S. Cl................ 332/19, 307/271, 331/113 R
[51] Int. Cl................................................ H03c 3/08
[58] Field of Search....................... 332/1, 16 R, 14, 332/16 T, 19, 18; 331/113 R; 307/271; 321/69 R

[56] References Cited
UNITED STATES PATENTS

| 3,022,469 | 2/1962 | Bahrs et al............................ 332/14 |
| 3,328,724 | 6/1967 | Way.................................. 332/14 X |
| 3,517,339 | 6/1970 | Hubbard et al....................... 332/14 |

Primary Examiner—Alfred L. Brody
Attorney—Flehr, Hohbach, Test, Albritton & Herbert

[57] ABSTRACT

A voltage to frequency converter having a pair of standard charge dispensers each generating a ramp function, the ramp function being utilized in an AND-OR invert gate to provide a free mode of operation.

6 Claims, 3 Drawing Figures

INVENTOR
GARY C. HENRICKSON

VOLTAGE TO FREQUENCY CONVERTER HAVING DUAL STANDARD CHARGE DISPENSERS

BACKGROUND OF THE INVENTION

The present invention is directed to a voltage to frequency converter; more particularly to a converter of the type having dual standard charge dispensers.

In many applications it is desirable to have signal information in the form of frequency rather than voltage. One type of prior converter is illustrated in FIG. 1 and is more fully described in U.S. Pat. No. 3,517,339 issued to Hubbard et al., June 23, 1970. Referring to FIG. 1, an input signal is applied to terminal pair 10 and charges the integrating capacitor $C_I$ through a series resistor $R_{in}$. Integrating capacitor $C_I$ operates with substantially zero volts across it so that the current flowing into the capacitor from the source is controlled by the amount of input voltage divided by the resistance of $R_{in}$. The charging current flowing into the integrating capacitor $C_I$ also varies the voltage at node 11. A controlled multivibrator 13 is coupled at node 11 through control amplifier 12. The multivibrator 13 develops a control pulse whenever the applied voltage reaches a predetermined level the control pulse occurring at a frequency which is proportional to the magnitude of the input signal. In normal operation, the voltage is above zero for only a short time and the circuit's natural periodic oscillation is suppressed after one pulse is permitted.

A gate 14 couples multivibrator 13 to bistable flip-flop 16. On the outputs 16c and 16d of flip-flop 16 are symmetrical waveshapes which drive standard charge dispensers 17 and 20 through switches 18 and 21. These successively provide a standard charge $Q_s$ which withdraws energy from integrating capacitor $C_I$ in order to provide the substantially zero voltage level on the capacitor. Because of the feedback loop formed by the standard charge dispensers, standard charges $Q_s$ will be dispensed at a rate sufficient to counteract the input voltage. Thus, the frequency of the controlled multivibrator 13 is proportional to the magnitude of the input voltage.

A standard charge dispenser is disclosed in U.S. Pat. No. 3,022,469 entitled "Voltage To Frequency Converter," issued to G. S. Bahrs et al. and assigned to the present assignee. As defined by Bahrs patent, a standard charge is one which is always of the same magnitude.

The circuit of FIG. 1 utilizing the flip-flop circuit 16 and the two standard charge dispensers 17 and 20 provides for lower frequency operation of the standard charge dispensers which operate in essence at half frequency and thus must be designed to only accommodate this half frequency. However, the foregoing feature necessitates the inclusion of additional elements such as flip-flop 16 and gate 14. This is, of course, in addition to the controlled multivibrator which includes timing capacitors in order to provide a free running relatively high frequency during overload or starting conditions to insure proper recovery of a circuit and a return to the normal "slave" type operation where the multivibrator is driven only in response to the signal at node 11 exceeding a predetermined level.

OBJECTS AND SUMMARY OF THE INVENTION

It is therefore a general object of the invention to provide an improved voltage to frequency converter.

It is another object of the invention to provide a voltage to frequency converter which uses two standard charge dispensers and in which the circuit is highly simplified by combining several functional elements.

In accordance with the above objects there is provided a voltage to frequency converter comprising an integrating network connected to receive an input signal. Bistable means are responsive to the voltage level of the integrating network exceeding a predetermined value for successively changing from one state to another. Two standard charge dispensing means are coupled to the bistable means and the integrating network and are responsive of the successive changes of state to each for alternately drawing from the integrating network a standard charge. Each of the charge dispensing means includes means for generating a stable ramp function signal. Means are provided for feeding back at least a fraction of the ramp function signals to the bistable means. The bistable means include coincidence means responsive to the feedback ramp function signal exceeding a predetermined level concurrent with the voltage level exceeding the predetermined value for switching the bistable means from one state to the other, the switching occurring at a rate determined by the ramp function of the voltage level continuously exceeding the predetermined level.

DETAILED DESCRIPTION OF THE PREFERRED EMBODIMENT

Figure 2:
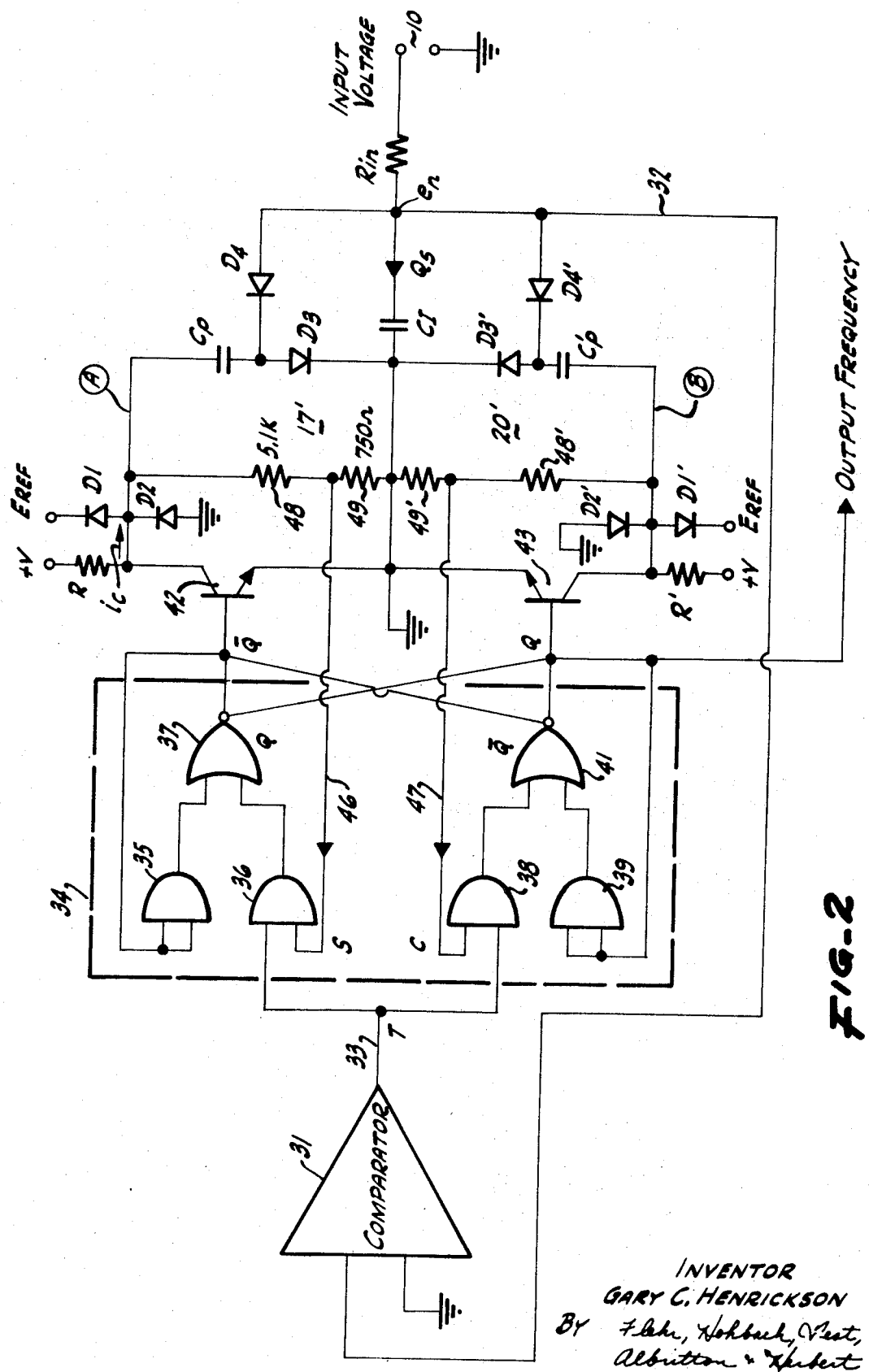
FIG. 2 is a schematic diagram of a voltage to frequency converter embodying the present invention.

Referring now to FIG. 2, the voltage to frequency converter includes an integrating capacitor $C_I$ coupled to a pair of input voltage terminals 10. The voltage level of integrating capacitor $C_I$ is coupled to comparator 31 by conductor 32. The comparator serves as a step type amplifier since its other input is coupled to common ground. Thus, when the voltage signal on $C_I$ exceeds zero the comparator will have a step output on its output line 33. This output line 33 is coupled to the input of a bistable circuit 34, indicated by the dashed block, which is responsive to the voltage level on line 33 changing from one state to the other. In other words, it functions as a flip-flop circuit having as indicated Q and $\bar{Q}$ outputs. The circuit, in fact, is a dual two-wide two-input AND-OR invert gate. It is commercially available from Texas Instruments with the designation SN7451N.

Bistable means 34 specifically includes a first pair of AND gates 35 and 36 coupled to an OR gate 37 which has its output inverted to form the Q output. Similarly, AND gate pairs 38 and 39 are coupled to the inputs of an OR gate 41 which has its output inverted to form the $\bar{Q}$ output of the bistable means 34. In order to provide latching, the $\bar{Q}$ output is cross-connected into both inputs of AND gate 35 and the Q output is cross-connected to both inputs of AND gate 39. Output line 33 of comparator 31 is coupled to one input of both AND gates 36 and 38 and provides a clocking function for the entire gate circuit 34 as will be discussed in detail below.

Figure 3:
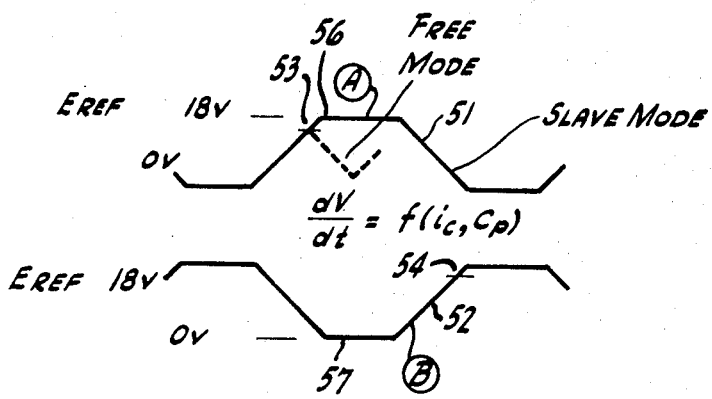
FIG. 3 are waveforms useful in understanding the circuit of FIG. 2.

Standard charge dispensers 17' and 20' are coupled to the Q and $\bar{Q}$ outputs of AND-OR invert gate 34 by current switching transistors 42 and 43 which have as their base inputs the $\bar{Q}$ and Q outputs respectively. Dispensers 17' and 20' are substantially identical in configuration to dispensers 17 and 20 of the above-mentioned Hubbard patent shown in FIG. 1. However, a fraction of the ramp function signals indicated as occurring at points A and B and shown in FIG. 3 are fed back to AND gates 36 and 38 on feedback paths 46 and 47.

Functionally, feedback path 46 serves as a "set" input for the gate 34 and feedback 47 a "clear" type input. The ramp function signal appearing at point A on dispenser 17 is coupled to path 46 by a center tap from a resistive voltage divider consisting of resistor 48 which has a nominal value of 5.1K ohms and resistor 49 having a nominal value of 750 ohms. In other words, in the preferred embodiment, a particular fraction of the signal appearing at point A or point B is approximately 13 percent. A similar voltage divider 48', 49' in the case of dispenser 20' is coupled between the point B and common feedback with the path 47 being the center tap and coupled to AND gate 38.

Current switches 42 and 43 operate in a complementary mode because of complementary transistors 42 and 43 are supplied bias voltages from a +V voltage bias source through resistors R and R' respectively. Signal points A and B are clamped between a reference voltage, $E_{ref}$, and common ground by diodes D1 and D2 respectively. Diode D3, coupled between the precision capacitor $C_p$ and ground, and diode D4 coupled between $C_p$ and a node designated $e_n$ are steering diodes to provide a path for the charging and discharging of the precision capacitor $C_p$. The discharge current flowing through D4 is in actuality the standard charge $Q_s$ which is taken out of $C_I$ to maintain its voltage at a zero level. In other words, the standard charge opposes the input charge stored in capacitor $C_I$ by the input voltage on terminals 10.

Standard charge dispenser 17' in operation, with transistor 42 in a nonconductive condition by reason of the $\bar{Q}$ input, allows a current, $i_e$, to flow into the node between D1 an D2 from the +V voltage source through resistor R. Assuming that the current $i_c$ is positive flowing into the node between D1 and D2, the capacitor $C_p$ has been charged to the $E_{ref}$ value. When gate circuit 34 changes state, a signal appears on the $\bar{Q}$ base input to transistor 42 causing a reversal of $i_c$ since point A is now grounded. Current is pulled out of precision capacitor $C_p$ causing the voltage at point A to fall. This generates the ramp function 51 shown in FIG. 3. The voltage continues to fall until zero volts is reached at which time diode D2 will begin to conduct so that the voltage can drop no further. Because of this symmetry of the circuit, during the discharge of $C_p$, the precision capacitor $C'_p$ has been charged up to the full reference voltage as illustrated by the ramp function 52.

Each time the above change takes place, the voltage at points A and B swings between $E_{ref}$ and zero and back to $E_{ref}$. Each time $C_p$ is discharged, the current flowing through $C_p$ must go through the steering diodes D3 and D4. Discharge current is routed through the diode D4 into the input node designated $e_n$ and thus into the integrating capacitor $C_I$. The total charge passed by the diode D4 each cycle is the voltage change times the value of the capacitor or very nearly $E_{ref} \times C_p$. Thus, a standard charge is dispensed each cycle of operation.

The ramp functions 51 and 52 are a function of the input current, $i_c$, into capacitor $C_p$, and the value of the capacitor itself. Since these are independent variables, they therefore remain constant and thus the ramp functions are substantially stable even with variations in the input and variations in the switching speed of circuit 34 and its Q and $\bar{Q}$ outputs. The solid line waveforms of FIG. 3 are for the slave mode of the voltage to frequency converter of the present invention where a change occurs only in response to a momentary "high" on line 33. However, during startup or overload, the voltage on capacitor $C_I$ might substantially exceed zero thus causing a continuous high indication on line 33. In this situation, the voltages on feedback paths 46 and 47, which are a predetermined fraction of the ramp functions shown in FIG. 3, alternately close the AND gates 36 and 38 when that voltage reaches a level 53 for one ramp and level 54 for the other ramp. This level corresponds to approximately 16 volts at point A which when reduced by the voltage divider 48, 49 is approximately 1.4 volts. This is a standard threshold level of an AND gate of the present type. When this level occurs, a change of state of the bistable circuit 34 occurs producing the dashed free mode waveform illustrated. Thus, a triangular waveform will drive the standard charge dispensers 17' and 20' at a relatively high frequency to cause sufficient standard charges to be withdrawn from $C_I$ until comparator 31 no longer produces a "high" indication on line 33. Thereafter the circuit will operate in a slave or normal mode where a standard charge $Q_s$ is withdrawn only in response to an output on line 33. This would normally, or course, occur on the flat portions 56 and 57 of the A and B waveforms.

Figure 1:
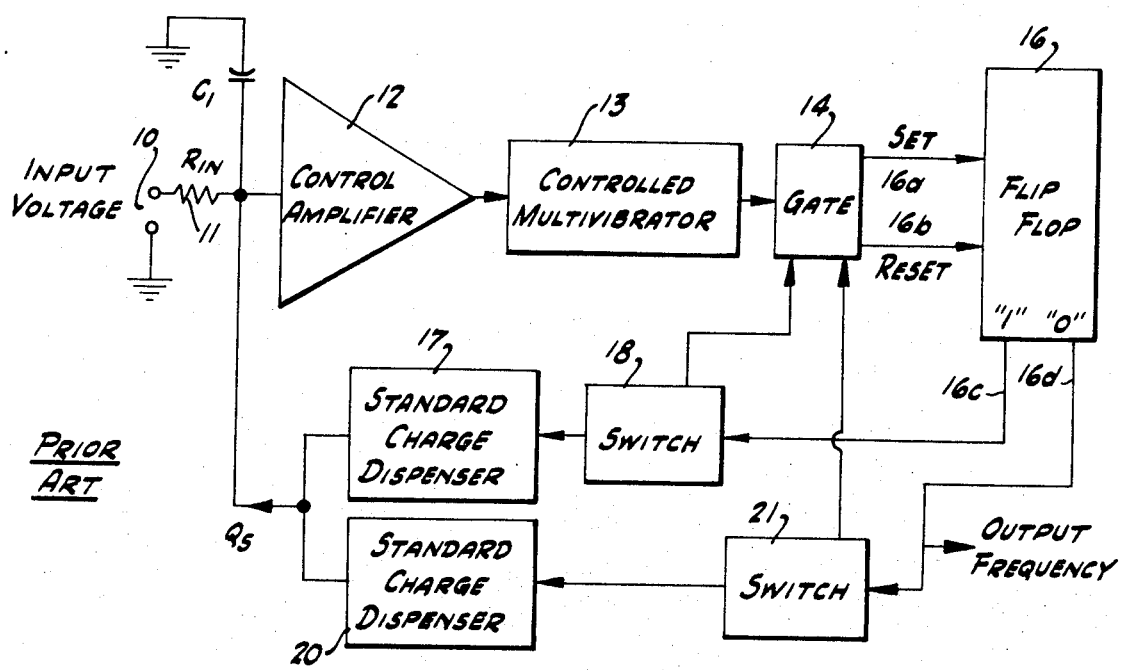
FIG. 1 is a block diagram of a voltage to frequency converter showing the prior art.

Thus, in summary and referring back to the prior art circuit of FIG. 1 and comparing it to FIG. 2, the present invention has provided a voltage to frequency converter. The trapezoidal waveform inherent in the standard charge dispenser of the prior art of FIG. 1 is used to provide for the free running mode of the circuit. In addition, the feedback of the ramp information indicates the present condition of each of the charge dispensers; in other words, which dispenser has recently dispensed a charge and which is the next successive charge dispenser to operate. Thus, the gate circuit 34 has effectively combined the functions of the controlled multivibrator 13, gate 14 and flip-flop 16 of the prior art circuit of FIG. 1.

I claim:

1. A voltage to frequency converter comprising: an integrating network connected to receive an input signal; bistable means responsive to the voltage level of said integrating network repeatedly exceeding a predetermined value for successively changing from one state to another; two standard charge dispensing means coupled to said bistable means and said integrating network and responsive to each of said successive changes of state to alternately draw from said integrating network a standard charge, each of said charge dispensing means including means for generating a stable ramp function signal; means for feeding back at least a fraction of said ramp function signals to said bistable means, said bistable means including coincidence means responsive to said feedback ramp function signal exceeding a predetermined level concurrent with said voltage level exceeding said predetermined value for switching said bistable means from one state to the other, said switching occurring at a rate determined by said ramp function if said voltage level continuously exceeds said predetermined level.

2. A voltage to frequency converter as in claim 1 where said ramp function signals of said two charge dispensing means are complementary and where said bistable means includes two coincidence means each of said complementary ramp function signals being respectively coupled to one of said coincidence means.

3. A voltage to frequency converter as in claim 1 where each of said means for generating said stable ramp function includes precision capacitor means and means for clamping the voltage swing across said precision capacitor means between two predetermined voltage levels.

4. A voltage to frequency converter as in claim 3 where one of said two predetermined voltage levels are a reference voltage and common ground respectively.

5. A voltage to frequency converter as in claim 1 where said bistable means includes a comparator for establishing said predetermined value of said voltage level of said integrating network.

6. A voltage to frequency converter as in claim 1 where said bistable means is a dual two-wide two-input AND-OR invert gate with complementary outputs cross connected to respective inputs to provide latching for bistable operation of said bistable means.

* * * * *